United States Patent [19]

Yonahara et al.

[11] Patent Number: 4,585,578

[45] Date of Patent: Apr. 29, 1986

[54] ELECTRICALLY CONDUCTIVE PLASTIC COMPLEX MATERIAL

[75] Inventors: Kunio Yonahara; Hiroshi Miyagawa, both of Yokohama; Shingo Aimoto, Tokyo, all of Japan

[73] Assignee: Kabushiki Kaisha Meidensha, Tokyo, Japan

[21] Appl. No.: 551,899

[22] Filed: Nov. 15, 1983

[30] Foreign Application Priority Data

Nov. 17, 1982 [JP] Japan .......................... 57-200383
Jan. 19, 1983 [JP] Japan .......................... 58-5795

[51] Int. Cl.⁴ .............................................. H01B 1/06
[52] U.S. Cl. ............................ 252/511; 252/518; 252/500; 252/182.1; 524/495; 524/496
[58] Field of Search ........... 524/451, 495, 422, 496, 524/429, 80, 401, 408; 252/511, 506, 500, 182.1; 429/101, 42, 212, 210, 50, 218

[56] References Cited

U.S. PATENT DOCUMENTS

| | | | |
|---|---|---|---|
| 4,124,747 | 11/1978 | Murer et al. | 252/511 |
| 4,139,675 | 2/1979 | Nagai et al. | 428/349 |
| 4,219,602 | 8/1980 | Conklin | 428/244 |
| 4,269,892 | 5/1981 | Shattuck et al. | 428/337 |
| 4,293,450 | 10/1981 | Vogel | 252/506 |
| 4,382,882 | 5/1983 | Vogel et al. | 252/503 |
| 4,388,227 | 6/1983 | Kalnin | 252/511 |
| 4,411,945 | 10/1983 | Akao et al. | 428/216 |
| 4,421,678 | 12/1983 | Mehtu | 524/451 |

OTHER PUBLICATIONS

G. Hawley, Ed., "The Condensed Chemical Dictionary", 8th Edition, Van Nostrand Reinhold Co., (1971), pp. 29, 168, 426.

Primary Examiner—Josephine L. Barr
Attorney, Agent, or Firm—Fleit, Jacobson, Cohn & Price

[57] ABSTRACT

Described is an electrically conductive plastic complex material composed of a starting or synthetic base resin material with addition and mixture thereto of electrically conductive carbon black and inorganic filler. According to the invention, the inorganic filler is a graphite or preferably doped graphite.

4 Claims, 1 Drawing Figure ically conductive plastic complex material endowed with the high electrical conductivity and mechanical strength with the use of commercial materials and in which volume resistivity is not affected by variation of temperature.

ELECTRICALLY CONDUCTIVE PLASTIC COMPLEX MATERIAL

BACKGROUND OF THE INVENTION

This invention relates to an electrically conducting plastics complex material endowed with higher than a certain value of electrical conductivity without inclusion of metallic contents and more particularly to such electrically conductive plastic complex material suitably used in conjunction with electrical, electronic or electrochemical devices such as metal-halogen batteries.

Recently, the use of the electrically conductive plastic complex material has become widespread not only in electrical devices for domestic use but as computer components or electrodes for recently developed metal-halogen batteries.

These electrically conductive plastic complex materials are used as so-called molded pieces or synthetic resin paint and are usually manufactured by dispersing fine powders of Ag, Cu, Al or the like metals or fine carbon particles into the synthetic resin. Since the electrically conductive plastic complex materials are prepared by simply dispersing electrically conductive substances into the non-conductive plastic material, their electrical conductivity may be fluctuated widely by non-homogeneous dispersion of the conductive particles. In addition, it has not been possible to increase the electrical conductivity beyond a certain limit although some electrically conductive complex with contents of the dispersed metallic powders exhibits an electrical conductivity of the order of $10^4$ to $10^5$ ohm$^{-1}$ cm$^{-1}$. The result is unavoidable limitations on the application of the electrically conductive plastic complex material.

Recently, it has been proposed to make use of certain dopants that may affect polyacetylene, polypyrrole or polyparaphenylene sulfide so as to make them electrical conductivity. However, the resulting material tends to be unstable in physical properties and the apparatus for producing it is also complicated in structure.

In general, the insulating materials such as plastics, semi-conductors such as Ge, Si, carbon black or graphite or conductors such as metal have intrinsic volume resistivity proper to them.

The volume resistivity for the insulating material is higher than $10^8$ ohm-cm, while that for semiconductors is $10^{-3}$ to $10^8$ ohm-cm and that for conductors is less than $10^{-3}$ ohm-cm.

The volume resistivity of these electrical materials change in accordance with variation of temperature.

Thus, the volume resistivity of the insulating material generally decrease with rise in temperature, while that of the semiconductors and that of conductors increase with rise in temperature. An electrically conductive complex material obtained by mixing carbon black into the base polymer and kneading them together is lightweight and low in cost while also exhibiting good workability. Hence, it is employed in a variety of electrical devices. However, the volume resistivity of this material also tends to increase with rise in temperature.

The result is that the electrical or electronic devices which make use of the carbon black mixed into the base polymer material undergo changes in their properties in accordance with variation of temperature and hence are not capable of keeping constant properties.

SUMMARY OF THE INVENTION

It is an object of the present invention to overcome the aforementioned defects of the prior art and to provide an electrically conductive plastic complex material which is endowed with the high electrical conductivity and mechanical strength with the use of commercial materials and in which volume resistivity is not affected by variation of temperature.

The present invention resides in an electrically conductive plastic complex material containing as essential constituents 30 to 80 wt. percent of base plastic complex material (component A), 5 to 40 wt. percent of electrically conductive carbon black (component B) and 5 to 65 wt. percent of graphite as inorganic filler (component C), related to the total contents of the essential components.

The present invention also resides in an electrically conductive plastic complex material consisting essentially of base plastic complex material (component A), 5 to 50 wt. percent of electrically conductive carbon black (component B) and 5 to 50 wt. percent of talcum as inorganic filler (component C).

DESCRIPTION OF THE PREFERRED EMBODIMENT

Figure 1:
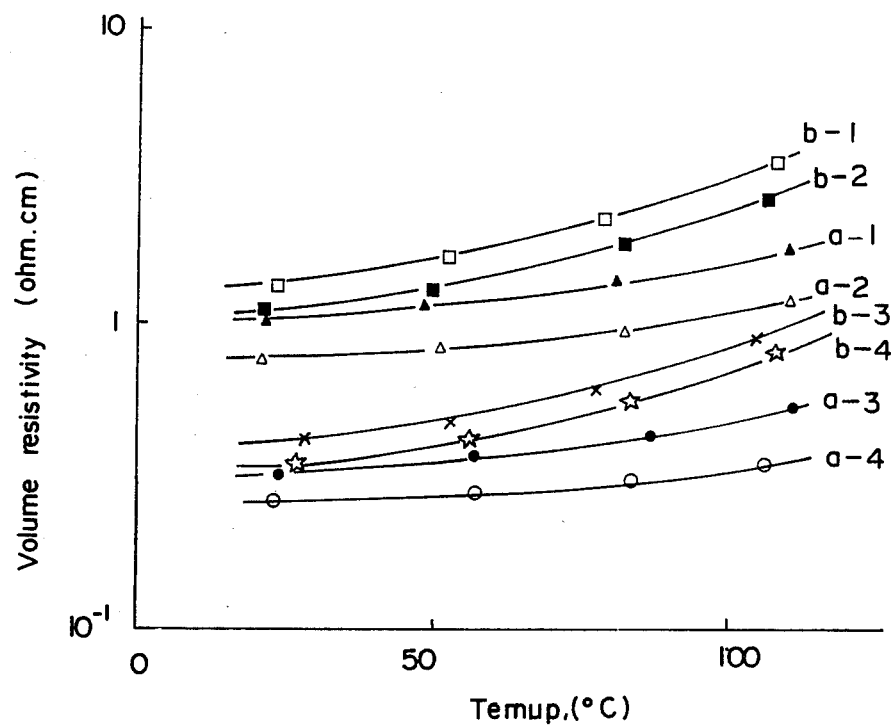
FIG. 1 is a graphic chart showing temperature characteristics of the volume resistivity for the Examples of the present invention and comparative Example.

Among base materials of the plastic complex material contemplated within the scope of the present invention, are thermosetting resins such as phenol, urea, melamine, epoxy, or alkyd, thermoplastic resins such as polyolefin, polystyrene, PMMA, polyvinyl acetate, PVA, polyvinylidene chloride or nylon, synthetic resin paint containing these resins, silicon rubbers such as SBR, butadiene rubber, polyisoprene rubber, EP rubber, NBR or polyurethane rubber, and a variety of synthetic fibers.

Although graphite can be used as it is, it may also be doped for further improving electrical conductivity of the conductive plastic complex material.

Among dopants to be used for this purpose are bromine, iodine, iodine chloride, iodine bromide, sulfuric acid, nitric acid and arsenic (V) fluoride.

As electrically conductive carbon black, various products resulting from incomplete combustion or heat cracking of material gas or liquid hydrocarbons may be used. However, the electrically conductive carbon blacks having the particle size in the range of 30 to 46 nm, surface area in the range of 245 to 1000 m$^2$/g, volatile contents in the range of 1 to 1.5 weight percent, pH in the range of 7.0 to 9.5; DBP oil absorption in the range of 160 to 340 ml/100 g, are most preferred.

The base plastic complex material (A), electrically conductive carbon black (B) and graphite (C), doped or not, and/or talcum as inorganic filler (to be described below) are mixed and kneaded in a conventional mixer or roll kneader and then formed by a conventional forming machine to a desired shape and the properties of these formed pieces were measured.

According to the first aspect of the present invention, 30 to 80 wt. percent and preferably 30 to 70 wt.% and most preferably 45 to 65 wt.percent of the component A, 5 to 40 wt. percent and preferably 5 to 35 wt. percent and most preferably 5 to 35 wt. percent of the component B and 5 to 65 wt. percent and preferably 15 to 65 wt. percent and most preferably 15 to 50 wt. percent of the component C, related to the total sum of these components are mixed together. With the component A lower in contents than those specified above, the resulting material is lowered in pliability and mechanical strength. With the component A higher in contents than those specified above it is not possible to realize sufficient electrical conductivity.

The electrically conductive plastic complex material of the aforementioned composition can be manufactured by using the conventional forming apparatus and endowed with excellent formability and electrical conductivity without significantly lowering its mechanical strength.

According to the second aspect of the present invention, thermoplastic resins such as polyethylene, polypropyrene or ethylene-propyrene polymer are used as component A. The electrically conductive carbon black (component B) is contained in a range of 5 to 50 wt. percent, and talcum as inorganic filler is contained in a range of 5 to 50 wt. percent, the balance being the component A.

The conductive carbon is contained in the range of 5 to 50 wt. percent because the conductive plastic complex material is lowered in electrical conductivity for carbon contents lower than 5 wt. percent and the material becomes difficult to formation for carbon contents higher than 50 wt. percent. On the other hand, talcum (inorganic filler) should be contained in the range of 5 to 50 wt. percent in consideration that the volume resistivity of the material may be affected with variation of temperature for talcum contents less than 5 wt. percent and becomes difficult to formation for talcum contents higher than 50 wt. percent.

The electrically conductive plastic complex material of the present invention is not affected substantially in volume resistivity, so that the electric or electronic devices made from this material also exhibit stable performation in spite of occasional variation of temperature. The inventive material is not affected substantially in volume resistivity and thus may consider the temperature variation of devices.

The present invention is described below by referring to the Example and the Comparative Examples.

The effects of the present invention obtained by these Examples are shown in Table 2.

The names and certain physical properties of the base plastic complex material (A), electrically conductive carbon black (B) and the inorganic filler (C) used in the Examples and Comparative Examples are shown in the following Table 1.

TABLE 1

Names and Properties of Components

| | | Commercial Name | Maker | Density (g/cm³) | m.p (°C.) | Softening point (°C.) | MFR (Melt Flow Rate g/10 min.) | Ex. No. | Comp. Ex. No. |
|---|---|---|---|---|---|---|---|---|---|
| Synthetic resin material (A) | | | | | | | | | |
| Polyethyrene | $A_1$ | 5000 SF | Mitsui Sekiyu Kagaku K.K. | 0.959 | 132 | | 0.75 | 1-(1) 3-(2) 6-(3) | 1-1, 3-3 |
| | $A_2$ | FX080 | Showa Denko K.K. | 0.953 | | 129 | 0.8 | 1-(4) 3-(5) 6-(2) | 1-2, 3-2 |
| | $A_3$ | S6008 | Showa Denko K.K. | 0.958 | | 129 | 0.8 | 3-(1) | |
| Polypropyrene | $A_9$ | MS230 | Tokuyama Soda K.K. | 0.91 | 150 | | 4 | 1-(2) 3-(3) 5, 6-(4) | 3-4 |
| | $A_{10}$ | MS660 | Tokuyama Soda K.K. | 0.9 | 150 | | 15 | 1-(3) | |
| Ethyrene-propylene-copolymer | $A_{11}$ | MS640 | Tokuyama Soda K.K. | 0.9 | 150 | | 6.5 | 3-(4) | |
| | $A_{12}$ | MS624 | Tokuyama Soda K.K. | 0.9 | 150 | | 2 | 6-(1) | 3-1 |
| Phenol denatured oil vanish | $A_{13}$ | #120B | Union Kasei K.K. | — | — | | — | 2, 4 | 2 |

| | | Commercial Name | Maker | absorption (ml/100 g) | N₂ Surface area (m²/g) | Ex. No. | Comp. Ex. No. |
|---|---|---|---|---|---|---|---|
| inorganic filler (C) | | | | | | | |
| elec. cond. carbon black (B) | $B_1$ | CONDUC-TEX-975 | Columbia carbon K.K. | 160 | 270 | 1-(1) 3-(4) 6-(3) | 3-3 |
| | $B_2$ | Ketchen black EC | Lion Acso K.K. | 350 | 950 | 1-(2) 1-(4) 2 3-(1) 3-(2) 3-(5) 4  5 | |
| | $B_3$ | VULCAN XC-72 | CABOT | 166 | 272 | 1-(3) 3-(3) 6-(2) 6-(4) | 1-2 3-2 3-4 |
| | $B_4$ | CONDUC-TEX-950 | Nippon Columbia K.K. | 175 | 245 | 6-(1) | 3-1 |
| graphite | $C_1$ | #200 | Tokai Carbon K.K. | particle size | 200 mesh | 1-(1) 1-(2) 1-(3) 1-(4) | 1-1, 2  2  5 |
| doped graphite | $C_{1-1}$ | " | Tokai Carbon K.K. | bromine depant liquid | | 3-(1) | |
| | $C_{1-2}$ | " | Tokai Carbon K.K. | iodine acetone solution | | 3-(2) | |
| | $C_{1-3}$ | " | Tokai Carbon K.K. | 3 mol iodine chloride/ 1 lit. methanol | | 3-(3) | |

| | Commercial Name | Maker | Physical Properties | Ex. No. | Comp. Ex. No. |
|---|---|---|---|---|---|

TABLE 1-continued

Names and Properties of Components inorganic filler (C)

| | | | | | | | | |
|---|---|---|---|---|---|---|---|---|
| doped graphite | $C_{1-4}$ | #200 | Tokai Carbon K.K. | | iodine bromide | | 3-(4) | |
| | $C_{1-5}$ | " | Tokai Carbon K.K. | | sulfuric acid | | 3-(5) | |
| | $C_{1-6}$ | " | Tokai Carbon K.K. | | nitric acid | | 4 | |
| | $C_{1-7}$ | " | Tokai Carbon K.K. | | arsenic fluoride (V) | | 5 | |

| | | | | powder, particle size | Analysis | | | | | | |
|---|---|---|---|---|---|---|---|---|---|---|---|
| | | | | | $SiO_2$ | MgO | $Al_2O_3$ | $Fe_2O_3$ | CaO | Ig. loss | Ex. No. |
| talcum | $C_{2-1}$ | ND | Nippon Talcum K.K. | −300 mesh | 61.7 | 31.1 | 0.8 | 0.9 | 0.2 | 5-3 | 6-(1) 6-(3) |
| | $C_{2-2}$ | MS | Nippon Talcum K.K. | −350 mesh | 62.3 | 36.7 | 0.1 | 0.8 | 0.2 | 4.9 | 6-(2) 6-(4) |

EXAMPLE 1

The starting materials of the following composition were injected into a pressure kneader heated to 160° C. and were kneaded for 15 minutes. The kneaded materials were formed by calender rolls to sheets 1 mm thick and the electrical conductivity as well as tensile strength of the resulting samples were measured. The results are shown in the Table 3.

| Test No. | 1-(1) | 1-(2) | 1-(3) | 1-(4) |
|---|---|---|---|---|
| synth resin mat. | $A_1$, 60 wt. % | $A_9$, 65 wt. % | $A_{10}$, 55 wt. % | $A_2$, 50 wt. % |
| elec. cond. carbon black | $B_1$, 10 wt. % | $B_2$, 5 wt. % | $B_3$, 15 wt. % | $B_2$, 5 wt. % |
| inorg. fillers | $C_1$, 30 wt. % | $C_1$, 30 wt. % | $C_1$, 30 wt. % | $C_1$, 45 wt. % |

EXAMPLE 2

Synthetic resin paint A 13(55 wt. percent of the total) was introduced into a three-roll calender and conductive carbon black $B_2$ (10 wt.percent) with graphite $C_1$ (35 wt. percent) was gradually added thereto. The resulting mixture was kneaded to an electrically conductive paint and the properties of the resulting samples were measured. The results are shown in Table 3.

COMPARATIVE EXAMPLE 1

The materials of the composition shown below were kneaded as in the Example 1. The properties of the resulting samples are shown in Table 3.

| Text No. | 1 - 1 | 1 - 2 |
|---|---|---|
| synth. resin mat. | $A_1$, 50 wt. % | $A_2$, 50 wt. % |
| elec. cond. carbon black | — | $B_3$, 10 wt. % |
| inorg. filler (graphite) | $C_1$, 50 wt. % | — |

COMPARATIVE EXAMPLE 2

The starting material consisting of 60 wt. percent of the synthetic resin material $A_{13}$ and 40 wt. percent of graphite $C_1$ were kneaded in the manner as described in Example 2 and the properties of the resulting samples were measured. The results are shown in Table 3.

EXAMPLE 3

A pressure kneader consisting of a ceramic mixer tank was set to 150° C. and the starting materials consisting of polyolefine synthetic resin material (A), carbon black (B) and doped graphite (C) were kneaded under kneading conditions α, β and the kneaded materials were pressed by calender rolls into sheets each 1 mm thick. The properties of the resulting sheets as measured are shown in Table 3.

Doped samples were obtained by immersing powdered graphite in a dopant for 20 hours. Excess dopant was removed by allowing the graphite to stand for 4 to 5 hours in a draft at room temperature after the graphite was removed from the liquid. The α condition refers to kneading in which the components A and B are kneaded for 10 minutes, then the component C is added to the resulting kneaded product and the resulting product with additive C is kneaded for 2 minutes, and the β condition to kneading in which a mixture of the components A, B and C are kneaded together for 15 minutes. The dopants used are also shown in Table 2.

TABLE 2

| | Composition and Kneading Conditions (the numerous weight percent) | | | | |
|---|---|---|---|---|---|
| Test No. | 3-(1) | 3-(2) | 3-(3) | 3-(4) | 3-(5) |
| Constituents | | | | | |
| Synth. resin mat. (A) | $A_3$, 60 | $A_1$, 50 | $A_9$, 50 | $A_{11}$, 50 | $A_2$, 60 |
| carbon black (B) | $B_2$, 10 | $B_2$, 10 | $B_3$, 30 | $B_1$, 30 | $B_2$, 10 |
| doped graphite (C) | $C_{1-1}$, 30 | $C_{1-2}$, 40 | $C_{1-3}$, 20 | $C_{1-4}$, 20 | $C_{1-5}$, 30 |
| dopants | bromine liquid | iodine in acetone solution | iodine chloride 3 mol in methanol | iodine bromide (50° C.) | sulfuric acid |
| knead. cond. | α | β | α | α | β |

EXAMPLE 4

Graphite $C_{1-6}$ was obtained by the doping treatment, i.e., pretreatment as described in Example 3 with use of nitric acid as dopant. Synthetic resin paint $A_{13}$ (50 wt. percent) was introduced into a three-roll calender as in Example 2. To the resulting product were gradually added 25 wt. percent of carbon black ($B_2$) and 25 wt. percent of the doped graphite ($C_{1-6}$). The resulting mixture was kneaded to an electrically conductive paint and the properties of the latter were measured. The results are shown in Table 3.

EXAMPLE 5

Powders of graphite $C_1$ were introduced in a stainless steel vessel, from which the air was evacuated. Arsenic fluoride (V) was introduced into the vessel to a pressure of 250 mm Hg. Doping was carried out at this pressure for 5 days. 30 wt. percent of polypropyrene ($A_9$) and 5 wt. percent of carbon black ($B_2$) were introduced into the pressure kneader of the Example 3 and kneaded for 10 minutes. To the resulting kneaded product were added 65 wt. percent of the doped graphite $C_{1-7}$. The resulting mixture was kneaded for two minutes and prepared into a sheet 1 mm thick the properties of which were then measured. The results are also shown in Table 3.

TABLE 3

| | | Properties of the Ultimate Plastic-Complex Materials | |
|---|---|---|---|
| | Sample Form | Electrical Conductivity $ohm^1 \, cm^1$ | Tensile Strength $kg/mm^2$ |
| Ex. 1-(1) | sheet | 5 | 390 |
| 1-(2) | " | 6.5 | 450 |
| 1-(3) | " | 4 | 400 |
| 1-(4) | " | 6.5 | 460 |
| Ex. 2 | liquid | 10 | 2.3 poise (30° C.) |
| Comp. 1-1 | sheet | $10^{-17}$ | 370 |
| Ex. 1-2 | sheet | $5 \times 10^{-3}$ | 380 |
| 2 | liquid | $10^{-17}$ | 1.5 poise (30° C.) |
| Ex. 3-(1) | sheet | $5 \times 10^2$ | 360 |
| 3-(2) | sheet | $2 \times 10^2$ | 310 |
| 3-(3) | sheet | $9 \times 10^2$ | 350 |
| 3-(4) | sheet | $7 \times 10^2$ | 350 |
| 3-(5) | sheet | $5 \times 10^2$ | 330 |
| 4 | liquid | $8 \times 10^3$ | 3.6 poise (30° C.) |
| 5 | sheet | $2 \times 10^3$ | 290 |

It is seen from the results in the above Table that the inventive material is significantly improved in electrical conductivity over the conventional material and compares favorably therewith in mechanical behavior, owing to the use of graphite and carbon black simultaneously, although the amount of additives to the synthetic resin material is same as that used in the conventional electrically conductive material.

EXAMPLE 6

The starting materials of the compositions shown in Table 4 below were injected into a pressure kneader heated to 180° C. and kneaded for 15 minutes and pressed into sheets each 1 mm thick by a calender unit. The resulting mixture was passed through calender rolls to a sheet 1 mm thick.

TABLE 4

| | Compositions (wt. %) | | |
|---|---|---|---|
| | Start Mat. | | |
| Test No. | Synth. resin mat. (A) | elec. cond. carbon black (B) | inorg. filler talc ($C_2$) |
| Ex. 6-(1) | $A_{12}$: 62.5 | $B_4$: 31.3 | $C_{2-1}$: 6.2 |
| Comp. Ex. 3-1 | $A_{12}$: 66.7 | $B_4$: 33.3 | — |
| Ex. 6-(2) | $A_2$: 34.5 | $B_3$: 17.2 | $C_{2-2}$: 48.3 |
| Comp. Ex. 3-2 | $A_2$: 66.7 | $B_3$: 33.3 | — |
| Ex. 6-(3) | $A_1$: 46.4 | $B_1$: 33.3 | $C_{2-1}$: 19.1 |
| Comp. Ex. 3-3 | $A_1$: 58.8 | $B_1$: 41.0 | — |
| Ex. 6-(4) | $A_9$: 47.6 | $B_3$: 42.9 | $C_{2-2}$: 9.5 |
| Comp. Ex. 3-4 | $A_9$: 52.6 | $B_3$: 47.4 | — |

Then, the volume resistivity of the resulting samples was measured as a function of temperature. The results are shown in FIG. 1.

In this figure, curves a-1 through 4 and b-1 through 4 stand for values obtained with Examples 6-(1) through (4), and comparative Examples 3-1 through 4 respectively.

It is seen from this figure that the samples a-1 through 4 with talcum contents are subject to only minor changes in volume resistivity relative to variation of temperature as compared to the samples b-1 through 4 without talcum contents, and that the volume resistivity itself of the samples a-1 through 4 is lowered.

What is claimed is:

1. An electrically conductive plastic complex material comprising:
    a homogeneous mixture consisting of a synthetic base resin material being present in an amount of 30 to 70 percent by weight, an electrically conductive carbon black being present in an amount of 5 to 30 percent by weight and a graphite being present in an amount of 15 to 65 percent by weight;
    said synthetic base resin material being at least one material selected from the group consisting of a polyethylene of more than 0.94 g/cm$^3$ density, a polypropylene of more than 0.90 g/cm$^3$ density, and an ethylene-propylene copolymer of more than 0.90 g/cm$^3$ density, and having a Melt Flow Rate of from 0.75 to 15 g/10 min.;
    said electrically conductive carbon black having a particle diameter of from 30 to 46 nm and a proportional surface area of from 245 to 1000 m$^2$/g, said graphite having a particle size of 200 mesh and below.

2. An electrically conductive plastic complex material according to claim 1, wherein said graphite is pretreated with at least one dopant, said at least one dopant being selected from a group consisting of bromine, iodine, iodine chloride, iodine bromide, sufuric acid, nitric acid and arsenic fluoride (V).

3. An electrically conductive plastic complex material comprising:
    a homogeneous mixture consisting of a synthetic base resin material being present in an amount of 30 to 70 percent by weight, an electrically conductive carbon black being present in an amount of 5 to 35 percent by weight and a graphite being present in an amount of 15 to 65 percent by weight;
    said synthetic base resin material being a material selected from the group consisting of a polyethylene of more than 0.94 g/cm$^3$ density and a polypropylene of more than 0.90 g/cm$^2$ density, and having a Melt Flow Rate of from 0.75 to 15 g/10 min.;
    said electrically conductive carbon black having a particle diameter of from 30 to 46 nm and a proportional surface area of from 245 to 1000 m$^2$/g, said graphite having a particle size of 200 mesh and below, and said plastic complex material being made from said homogeneous mixture having an electrical conductivity of from 4 ohm$^{-1}$.cm$^{-1}$ to $2 \times 10^3$ ohm$^{-1}$.cm$^{-1}$.

4. An electrically conductive plastic complex material according to claim 3, wherein said graphite is pretreated with at least one dopant, said at least one dopant being selected from a group consisting of bromine, iodine, iodine chloride, iodine bromide, sufuric acid, nitric acid and arsenic fluoride (V).

* * * * *